United States Patent [19]

Zhong et al.

[11] Patent Number: 5,204,073

[45] Date of Patent: Apr. 20, 1993

[54] TOXICITY ELIMINATION AND COMPREHENSIVE UTILIZATION OF CHROME RESIDUES

[75] Inventors: Gang Z. Zhong; Cheng Xiang Li; Xian Ke Zeng; Jin H. Lin; Wei C. Hou, all of Guangzhou, China

[73] Assignee: Guangzhou Zhufeng Institute, Guangzhou, China

[21] Appl. No.: 755,785

[22] Filed: Sep. 6, 1991

[30] Foreign Application Priority Data

Apr. 29, 1991 [CN] China .................. 91-1-02667.3

[51] Int. Cl.$^5$ .................. C01G 37/14; C01F 5/00; C01F 5/40; C01F 11/46
[52] U.S. Cl. .................. 423/58; 423/165; 423/166; 423/658.5
[58] Field of Search .................. 423/55, 57, 58, 165, 423/166, 658.5; 210/913

[56] References Cited

U.S. PATENT DOCUMENTS

| | | | |
|---|---|---|---|
| 3,371,034 | 2/1968 | Richards | 423/58 |
| 3,552,917 | 1/1971 | Weiss | 423/57 |
| 4,219,416 | 8/1980 | Ramirez et al. | 423/58 |
| 4,338,200 | 7/1982 | Zeijlstra | 423/55 |
| 4,954,168 | 9/1990 | Crnojevich et al. | 423/55 |

FOREIGN PATENT DOCUMENTS

| | | | |
|---|---|---|---|
| 1323537 | 7/1987 | U.S.S.R. | 423/55 |
| 235548 | 4/1926 | United Kingdom | 423/57 |

Primary Examiner—Michael Lewis
Assistant Examiner—Stephen G. Kalinchak
Attorney, Agent, or Firm—Leonard Bloom

[57] ABSTRACT

This invention relates to a method for toxicity comprehensive elimination of chrome residues, comprising adding water to chrome residues, wet-grinding the same to a thick liquid, letting it react with dilute hydrochloric acid, and letting the filtrate obtained react with an additive containing barium, with sulfuric acid or magnesium sulfate, and with cream of lime or soda, so as to realize a comprehensive extraction and utilization of various elements. The hydrochloric acids can be circulated, and the filter residues can be used for iron-smelting and brick-making. By means of this method, it is possible not only to completely and permanently eliminate the toxicity of the residues, but also to realize a comprehesive utilization of the residue resources. The method according to this invention requires only use of general technological equipment for chemical engineering production, and such equipment is easy to operate, requires little investment at a low cost, helps improving the environment and brings about beneficial economic results.

12 Claims, 1 Drawing Sheet

TOXICITY ELIMINATION AND COMPREHENSIVE UTILIZATION OF CHROME RESIDUES

BACKGROUND OF INVENTION

This invention relates to a method for disposal of solid waste, particularly chrome residues produced in the production of chromates. Chrome residues constitute one of the major pollution sources, for, besides oxides of magnesium, calcium, silicon, etc., they further contain 2.5-4% of chrome oxidates, wherein the content of water-soluble and acid-soluble chrome ions with a valency of 6 are 0.28-1.34% and 0.91-1.49%, respectively, and these are very harmful to humans and animals.

In recent years, there have been lots of reports concerning methods for toxicity elimination of chrome residues, among which the common method is to reduce six-valency chrome to three-valency chrome, followed by deep burial conservation, such as reduction toxicity elimination of dry- or wet-method. However, a serious problem existing with such methods is that $Cr3+$ reduced from $Cr6+$ can be raised back to $Cr6+$ again, especially when CaO, MgO exists in the chrome residues, since such form conditions for $Cr3+$ to be raised.

In the meantime, chrome residues can be used as a raw material, thus opening up a new path for treatment of the same. For example, they can be used as a glass coloring agent, for the making of color cement, and for making of bricks, mineral wool, etc. Such use, however, could become a second source of pollution due to dust rising; and then, an industrialized production is impractical since the market demand for such material is too little.

Recent reports from the U.S.A. disclosed a method of inserting electrodes in the chrome residues, to attain a high temperature and melt the residues into a glass material, thus eliminating the toxicity of the same. That method, however, consumes too much energy, and cannot realize a thorough toxicity elimination.

Toxicity elimination methods developed during the past 20 years generally involve the use of hydrochloric acid for melting the chrome residues. A Chinese patent application CN 85 1 05628 disclosed a method, as stated above. Such methods mostly control the pH value of the residues solution between 1 and 2, while a reductant is added to reduce $Cr6+$ to $Cr3+$ at a high reaction temperature. Nevertheless, due to large quantities of hydroxide colloids produced in the reaction, it is very difficult to separate the solid and the liquid. Therefore, the problem of preventing $Cr3+$ from being raised back to $Cr6+$ remains unsolved.

OBJECTS OF INVENTION

The object of this invention is to prevent $Cr3+$ from being raised back to $Cr6+$ during treatment of chrome residues, and to solve the problem of secondary pollution during treatment of the same, so as to realize both toxicity elimination of chrome residues, as well as a comprehensive utilization of the same as a raw material.

DESCRIPTION OF INVENTION

Figure 1:
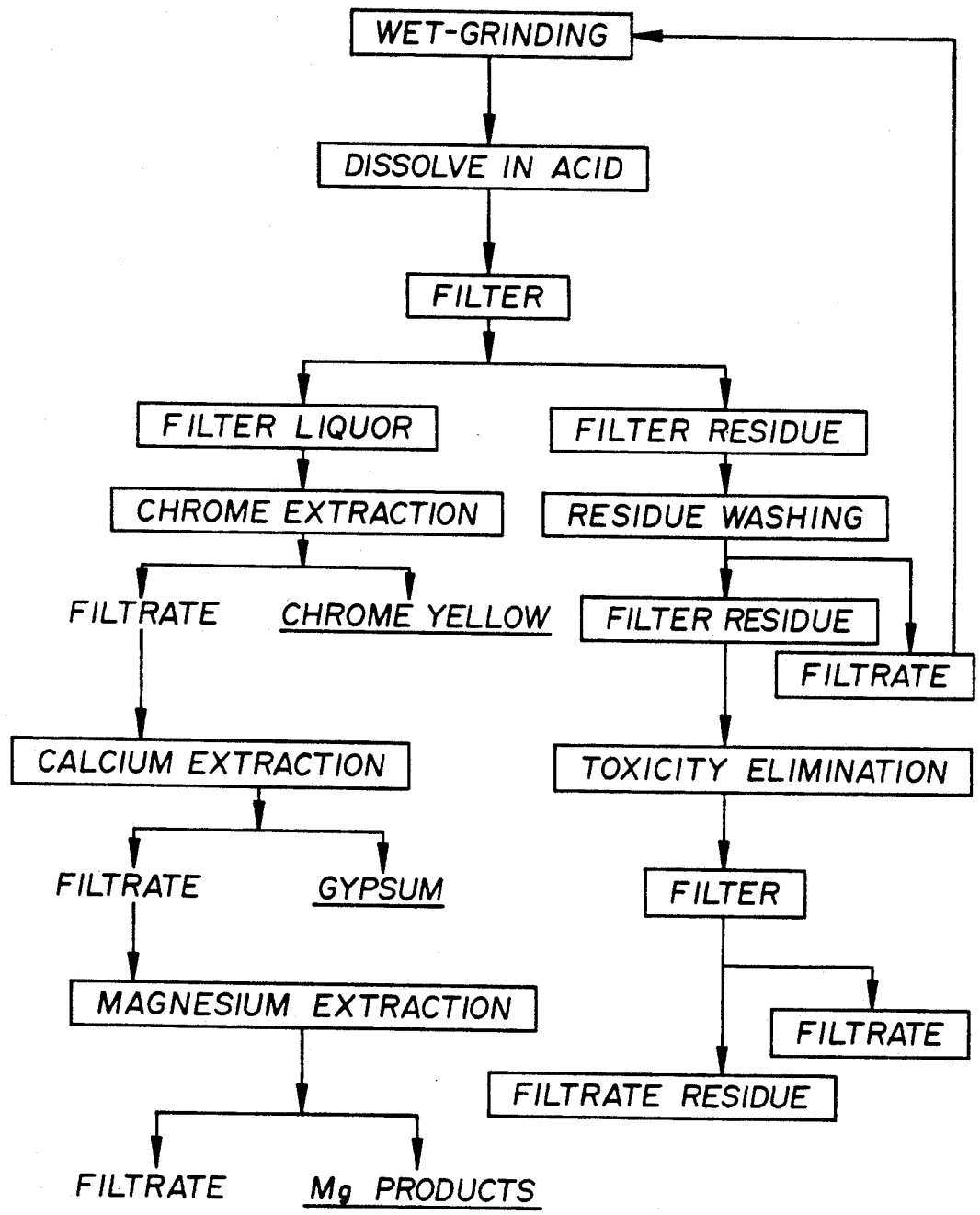
FIG. 1, illustrates the process steps of the method of the present invention.

The method according to this invention comprises the following steps:

1. Add water to the chrome residues and wet-grind the same to a grain size of 120-140 meshes/inch; and after paddling, agitate with dilute hydrochloric acid or its by-product (content of HCl 15.1-18%), or with industrial waste hydrochloric acid. Then, controlling the reaction time to be 5-9.5 min., the reaction temperature at 30°-49.5° C., and the pH value of the residues solution between 6.6 and 7.5, dissolve out only the $Cr+6$ and the basic Ca and Mg ions. The main chemical equations follow:

Up to this step, soluble $Cr6+$ ions and easily soluble Ca, Mg ions that have been dissolved already amount to 30-35% of the total residues, so that the residues basically contain no more $Cr6+$ ions. And the remaining $Cr3+$ ions $(Cr(OH)3)$ cannot be raised back to $Cr6+$ ions, either, due to lack of basic calcium and magnesium oxidates.

The content of $Cr6+$ in the remaining filter residue is less than 1 ppm, while its Fe content shows an obvious increase, which makes it a useful raw material for iron-smelting. If a proper amount of additive, such as coal powder or clay, is added to the filter residue, it can be used as a raw material for making bricks.

2. Extraction of Chrome:

To the filter liquor containing chrome, add an additive containing barium (such as barium chloride or barium hydroxide), to produce a barium chromate sediment (barium chrome yellow):

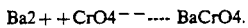

3. Extraction of Calcium:

Filtrate after the above-mentioned chrome extraction contains calcium chloride, magnesium chloride, etc. Add a proper amount of sulfuric acid or magnesium sulfate, to obtain a sediment of dihydrate calcium sulfate. Further, heat the sediment to 160° C., to be dried to a semihydrate gypsum product $(CaSO4.\frac{1}{2}H2O)$. The main reaction equations are as follows:

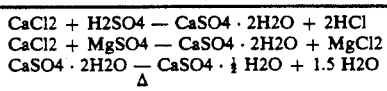

4. Extraction of Magnesium:

Filtrate after the above-mentioned calcium extraction contains magnesium chloride (also little amount of magnesium sulfate). In accordance with different needs of different products, extraction of magnesium can be performed as follows:

(1) Add cream of lime $(Ca(OH)2)$ to produce magnesium hydroxide sediment, and then let it react with sulfuric acid to obtain magnesium sulfate.

(2) Add sulfuric acid to concentrated magnesium chloride, to produce magnesium sulfate and gaseous hydrogen chloride. Absorb the gaseous hydrogen chloride with water to recover hydrochloric acid for recirculation. The main equations are:

$$Mg^{2+} + 2OH^- \longrightarrow Mg(OH)_2 \downarrow$$

$$Mg(OH)_2 + H_2SO_4 \longrightarrow MgSO_4 + 2H_2O$$

$$MgCl_2 + H_2SO_4 \longrightarrow MgSO_4 + 2HCl \uparrow$$

(3) Add substance containing carbonate radicals, such as sodium carbonate, and heat up to 90° C., producing basic magnesium carbonate. Dry to light magnesium carbonate, or decompose direct into light magnesium oxide through calcine at 900°–950° C. The main equations follow:

$$MgCl_2 + Na_2CO_3 \longrightarrow MgCO_3 \cdot Mg(OH)_2 \cdot 4H_2O + 2NaCl$$

$$4MgCO_3 \cdot Mg(OH)_2 \cdot 4H_2O \longrightarrow 5MgO + 4CO_2 + 5H_2O.$$

5. Treatment and Utilization of the Filter Residues:

Add water to wash the filter residue obtained through filtration of the afore-mentioned chrome residue solution. Add an additive (barium chloride or FeSO4) to perform wet-method thorough toxicity elimination of the same (content of water-soluble Cr6+ less than 1 ppm). Then further filter, and the filtrate recovered can be used for wet-grinding of the chrome residues, while the filter residue can be used for iron-smelting or for making bricks.

In comparison with the prior art techniques, the method according to this invention has such advantages that large quantities of residues can be treated while filtration is easy to operate, and particularly toxicity elimination according to this method can be thoroughly carried out and Cr3+ can be prevented from being raised back to Cr6+. In addition, chrome, calcium and magnesium products can be recovered, such that nothing is wasted and a comprehensive utilization of the residues as a whole is realized without producing any secondary pollution. The process according to this invention is easy to get hold of, and the problem of equipment corrosion is also well solved. Besides, by-products of hydrochloric acid and industrial waste acids can be used, thus lowering the cost and solving the problem of pollution of waste hydrochloric acid at other industrial lines. The method is, therefore, suitable for large-scale production of an industrialized level, and produces a very good environment and good economic results.

Below, a few examples according to this invention will be given with reference to the accompanying drawing FIG. 1.

EXAMPLE 1

2000 g of new chrome residues were taken from the Yue-Bei Inorganic Chemistry Factory, and wet-ground up to 140 meshes/inch, then 2000 ml of water and 1500 ml of 29% hydrochloric acid were added, and again 3000 ml of water were added (at this moment the concentration of hydrochloric acid was 10.3%), and then a reaction was made to occur at 49° C.

The solution obtained was filtered, to obtain 2390 g (wet weight, water content 50.5%) of filter residues. Further 3000 ml of water were added to dilute. 200 ml of toxicity elimination liquid were then put in; the filtrate after filtration was found to contain 0.04 ppm of Cr6+, and the filter residues—0.96 ppm of Cr6+.

5100 ml of acid-soluble filter liquor were taken, containing 8.20 g/l of Cr6+, 40.48 g/l of CaO, and 12.18 g/l of MgO. Concentration of the filter liquor was 22.5% (at 29° C.), and its pH value—6.6.

1920 ml of barium-containing additive (for instance, barium chloride), were added, to obtain 227 g (after drying) of barium chromate (barium chrome yellow). 6000 ml of chrome-extracted filter liquor (concentration 24%) were taken. Then, 1800 ml of MgSO4 solution (250 g/l) were added, to obtain 428 g of semi-hydrate gypsum. Further, 500 g of NH4HCO3 (90%) or Na2CO3 (90%) were added to the calcium-extracted filter liquor, to obtain 147 g of light magnesium oxide (97.2%).

EXAMPLE 2

2000 g of new chrome residues were taken from the Changsha Chromate Plant, and 2000 ml of water were added. Further, 1500 ml of hydrochloric acid (29%) were added, and 3000 ml of water were added to dilute. Then, reaction was allowed at 49° C. with the reaction time controlled to be 9.5 min.

After filtration, 2850 g of wet filter residues (water content 49.41%) were obtained. 3000 ml of water were added to dilute. Further, 200 ml of toxicity elimination liquid were added, and the filter liquor after filtration was found to contain 0.036 ppm of Cr6+ and the filter residues—0.44 ppm of Cr6+

5310 ml of acid-soluble filter liquor were taken, its concentration being 20.3%, and pH value—6.5, and Cr+6 content being 3.21 g/l, CaO content—36.00 g/l, and MgO content—17.20 g/l.

310 ml of barium-containing additive (such as barium chloride) were added to the filter liquor, to obtain 85 g (after drying) of barium chromate (barium chrome yellow). Further, 5520 ml of chrome-extracted filter liquor were taken, its concentration being 21% (at 29° C.). 1700 ml of MgSO4 (250 g/l) were added to it, to obtain 402 g of semi-hydrate gypsum. Further, 510 g of NH4HCO3 (90%) or Na2CO3 (90%) were added to the calcium-extracted filter liquor, to obtain 150 g of light magnesium oxide.

EXAMPLE 3

2000 kg of old chrome residues, accumulated in the open air for many years, were taken at the Jiang Men (Chromate) Chemistry Plant. 1000 kg of water were added, and further, 1500 kg of hydrochloric acid (29%) were added, and 1724 kg of water were added to dilute. Reaction temperature was controlled at 42° C., and reaction time—9 min.

The filter slags after filtration weighed (wet) 1918 kg (water content 30%). 72 kg of toxicity elimination additive were added. The filter liquor after toxicity elimination was found to contain 0.04 ppm of Cr6+ and the filter residues—0.9 ppm of Cr6+.

2.06 M3 of acid-soluble filter liquor were taken, and 60 ml of barium-containing additive (257 g/l) were added, to obtain 11.5 kg of barium chrome yellow product.

0.8 M3 of MgSO4 (246 g/l) were added to 1.76 M3 of chrome-extracted filter liquor, to produce 187 kg of semi-hydrate gypsum.

To 1.00 M3 of calcium-extracted filter liquor, 1.16 M3 of NH4NCO3 (168.5 g/l) or a corresponding amount of Na2CO3 were added, to obtain 37.5 kg of light magnesium oxide.

Based upon the above calculation, upon treating every ton of chrome residues, 11.87 kg of barium chrome yellow, 230 kg of semi-hydrate gypsum, and 101.5 kg of light magnesium oxide were obtained.

EXAMPLE 4

100 g of old chrome residues from the USA, accumulated for years, were taken, and wet-ground to 140 meshes/inch. 60 ml of water were added. Further, 120 ml of 12% hydrochloric acid were added, and reaction went on for 5 min., with the temperature controlled at 33° C., and the pH value controlled at 7.

After filtration, 123 g of wet filter residues were obtained (water content 35.85%). 200 g of water were further added to dilute. Then, a toxicity elimination agent was added, and the filter residues were found to contain 0.44 ppm of $Cr6+$, and the filter liquor—0.03 ppm of $Cr6+$.

163 ml of acid-soluble filter liquor were taken, containing 0.009 g/l of $Cr6+$, 35.24 g/l of CaO and 15.05 g/l of MgO. Chrome yellow, semi-hydrate gypsum and light magnesium oxide were extracted in a manner, similar to the above-mentioned.

To sum it up, for toxicity elimination of chrome residues, and a comprehensive utilization of its products the main parameters (average) follow:

Chrome residues 1000 kg;
Dilute hydrochloric acid (concentration between 15.1 and 18%) 1200 kg;
Reaction temperature controlled at 30°–49° C.;
Reaction time: 5–9.5 min.;
pH value=6.6–7.5.

Contents of products produced: Chrome yellow: Content of barium chromate>81%; Gypsum: Content of calcium sulfate>98%; Light magnesium oxides: Content of MgO>96%.

What is claimed is:

1. A method for toxicity elimination of chrome residues including calcium and magnesium comprising adding water to said chrome residues and wet-grinding the same, reacting the ground residues with hydrochloric acid having a concentration of 15.1–18% HCl, and said reaction being controlled, such that a reaction temperature of between 30°–49.5° C. and a pH of between 6.6 and 7.5 is maintained for between 5–9.5 minutes, whereby a solution is obtained having dissolved therein ions of chrome, including $Cr^+$ and ions of magnesium and calcium, and further whereby a residue is obtained and separating the solution from the residue, whereby a filter liquor including the chrome ions in the solution and a residue is provided; adding a barium-containing additive selected from the group consisting of barium chloride and barium hydroxide to the filter liquor, to form a sediment of barium chromate.

2. A method as claimed in claim 1, further including separating the filter liquor from the barium chromate sediment to obtain a reaction filtrate and sulfuric acid is added to the reaction filtrate, to further obtain a sediment of calcium sulfate.

3. A method as claimed in claim 1, further including separating the filter liquor from the barium chromate sediment wherein a reaction filtrate is obtained and wherein magnesium sulfate is added to the reaction filtrate, to further obtain a sediment of calcium sulfate.

4. A method as claimed in claim 2, further including separating the reaction filtrate from the calcium sulfate sediment, wherein a filtrate containing magnesium ions is obtained and, wherein $Ca(OH)_2$ is added to the separated filtrate, to form a sediment, and the sediment is made to react with sulfuric acid, to obtain magnesium sulfate.

5. A method as claimed in claim 3, further including separating the reaction filtrate from the calcium sulfate sediment, wherein a filtrate containing magnesium ions is obtained and, wherein $Ca(OH)_2$ is added to the filtrate, to form a sediment, and the sediment is made to react with sulfuric acid, to obtain magnesium sulfate.

6. A method as claimed in claim 2, further including separating the reaction filtrate from the calcium sulfate sediment, wherein a filtrate including magnesium chloride is obtained and, wherein the filtrate has sulfuric acid added thereto, whereby gaseous hydrogen chloride is formed and the produced gaseous hydrogen chloride is then absorbed with water to recover hydrochloric acid for recirculation.

7. A method as claimed in claim 3, further including separating the reaction filtrate from the calcium sulfate sediment, wherein a filtrate including magnesium chloride is obtained and, wherein the filtrate has sulfuric acid added thereto, whereby gaseous hydrogen chloride is formed and the produced gaseous hydrogen chloride is then absorbed with water to recover hydrochloric acid for recirculation.

8. A method as claimed in claim 2, further including separating the reaction filtrate from the calcium sulfate sediment, wherein a filtrate is obtained, and wherein sodium carbonate is added to the filtrate, and the sodium carbonate/filtrate mixture is heated, to produce a sediment of basic magnesium carbonate and the sediment of basic magnesium carbonate is further dried to produce light magnesium carbonate.

9. A method as claimed in claim 3, further including separating the reaction filtrate from the calcium sulfate sediment, wherein a filtrate is obtained, and wherein sodium carbonate is added to the filtrate, and the sodium carbonate/filtrate mixture is heated, to produce a sediment of basic magnesium carbonate and the sediment of basic magnesium carbonate is further dried to produce light magnesium carbonate.

10. A method as claimed in claim 8, wherein said basic magnesium carbonate is directly heated without being dried to a temperature of between 900°–950° C. to be calcined to light magnesium oxide.

11. A method as claimed in claim 9, wherein said basic magnesium carbonate is directly heated without being dried to a temperature of between 900°–950° C. to be calcined to light magnesium oxide.

12. A method as claimed in claim 1, wherein the chrome residues further include iron, such that the controlled reaction of the wet-ground residues with hydrochloric acid forms a solution also having dissolved iron ions therein, and further wherein water is added to wash the filter residues obtained, whereby a water/residue wash mixture is formed, and a wet method toxicity elimination is performed by adding barium chloride or to the water/residue wash mixture, and after further filtration, the filtrate recovered is used for wet-grinding of chrome slags, while the filter residues are used for iron-smelting or making bricks.

* * * * *